(12) United States Patent
Maguire

(10) Patent No.: US 6,505,694 B2
(45) Date of Patent: Jan. 14, 2003

(54) RECREATIONAL VEHICLE

(76) Inventor: Raymond Maguire, 191, Route 108, Lenoxville, Quebec (CA), J1M 2A2

( * ) Notice: Subject to any disclaimer, the term of this patent is extended or adjusted under 35 U.S.C. 154(b) by 0 days.

(21) Appl. No.: 09/548,786

(22) Filed: Apr. 13, 2000

(65) Prior Publication Data

US 2001/0047894 A1 Dec. 6, 2001

Related U.S. Application Data

(60) Provisional application No. 60/129,160, filed on Apr. 14, 1999.

(51) Int. Cl.⁷ .................................................. B60F 3/00
(52) U.S. Cl. .................... 180/9.1; 180/9.46; 440/12.54; 440/12.56
(58) Field of Search ................................. 180/9.1, 9.26, 180/9.28, 9.3, 9.32, 9.46, 183, 184, 185, 9.21, 9.25; 114/344; 440/12.5, 12.51–12.54, 12.56, 12.63, 12.66

(56) References Cited

U.S. PATENT DOCUMENTS

| | | | | |
|---|---|---|---|---|
| 2,187,658 A | * | 1/1940 | Lane et al. ................... 115/1 |
| 2,466,236 A | * | 4/1949 | Hecker ........................... 115/1 |
| 3,450,089 A | * | 6/1969 | Lippincott ..................... 115/1 |
| 3,710,882 A | * | 1/1973 | Marceau ..................... 180/9.38 |
| 3,794,131 A | * | 2/1974 | Freedman et al. ........... 180/5 R |
| 4,195,702 A | * | 4/1980 | Denis ........................... 180/183 |
| 4,958,584 A | * | 9/1990 | Williamson ................. 114/270 |
| 5,181,478 A | * | 1/1993 | Berardi ........................ 114/270 |
| 5,400,734 A | * | 3/1995 | Doyon ......................... 114/270 |
| 6,062,156 A | * | 5/2000 | Radke et al. ............. 114/144 R |
| RE36,901 E | * | 10/2000 | Roycroft et al. .......... 440/12.52 |
| 6,159,058 A | * | 12/2000 | Matheson ................... 440/12.5 |

* cited by examiner

Primary Examiner—Paul N. Dickson
Assistant Examiner—Tony Winner
(74) Attorney, Agent, or Firm—Eric Fincham

(57) ABSTRACT

A recreational vehicle which has a body which may be configured for land use or as a boat haul, the vehicle also having a pair of non interconnected spaced apart front wheels, an endless track located rearwardly of an intermediate of the spaced apart front wheels, a motor operatively connected to a drive at least the endless track and optionally the front wheels. The vehicle is able to handle most types of snow and land conditions and can be configured to operate in water if so desired.

7 Claims, 5 Drawing Sheets

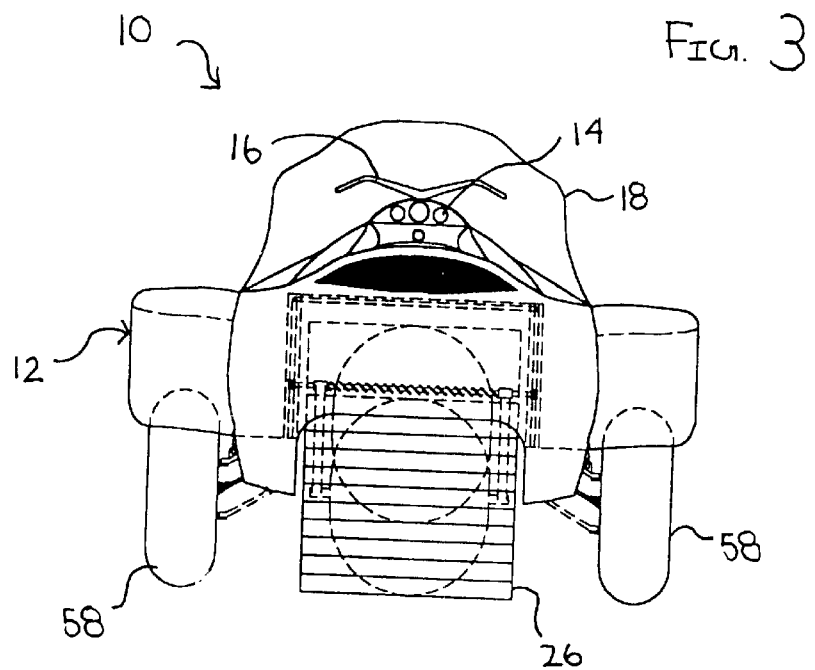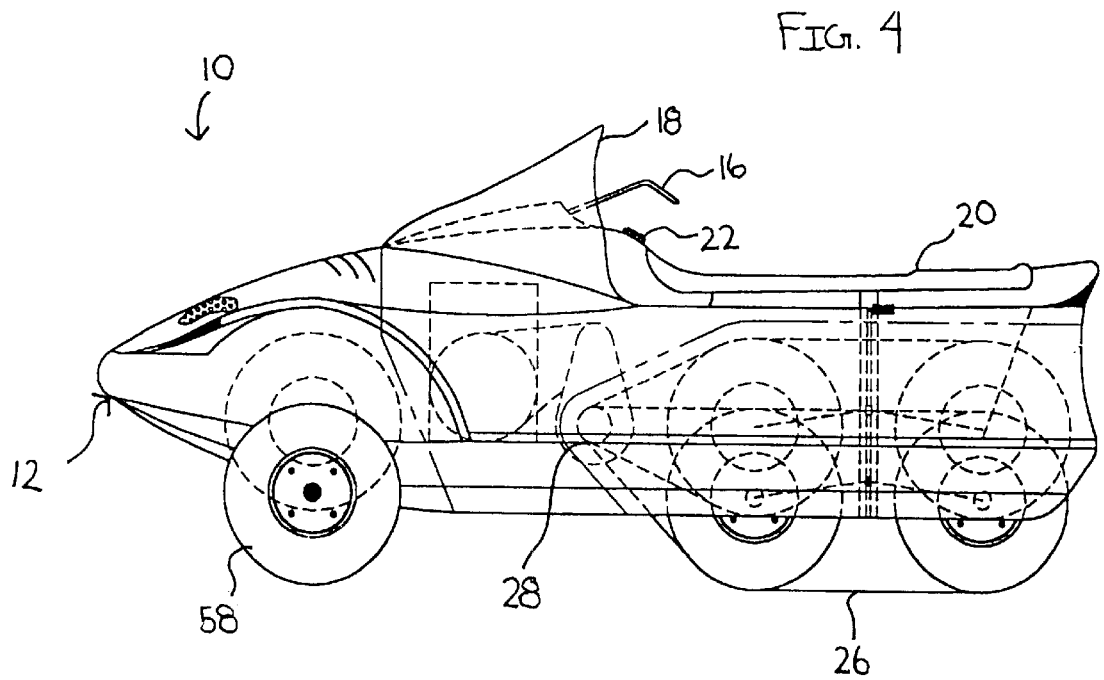

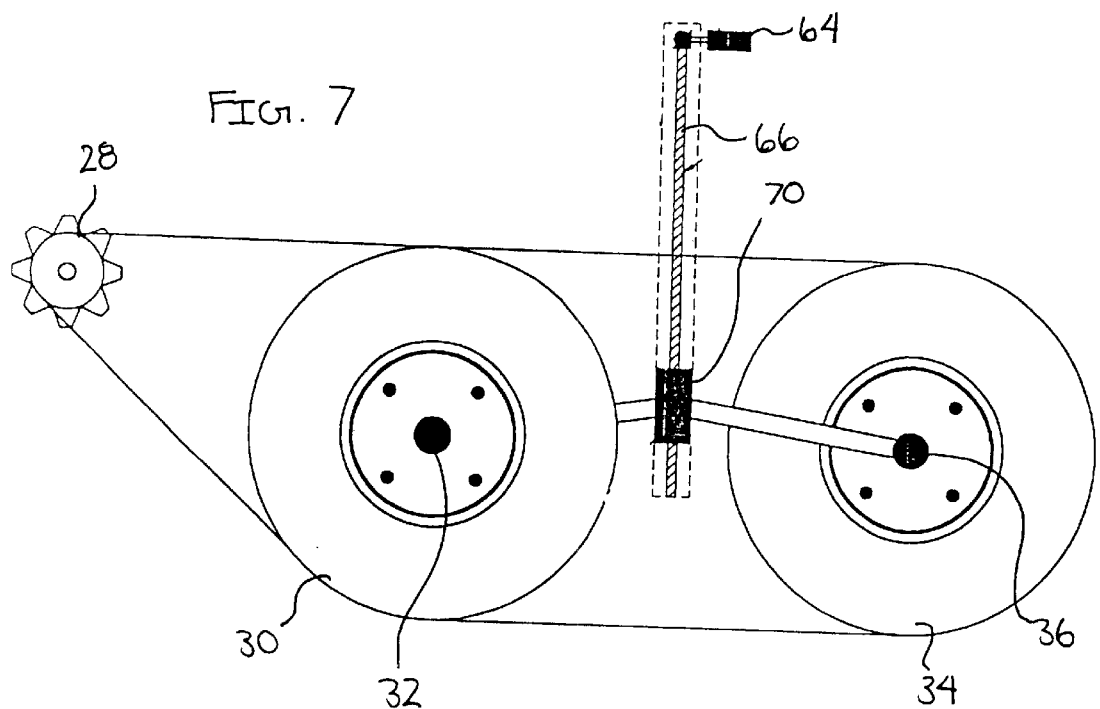
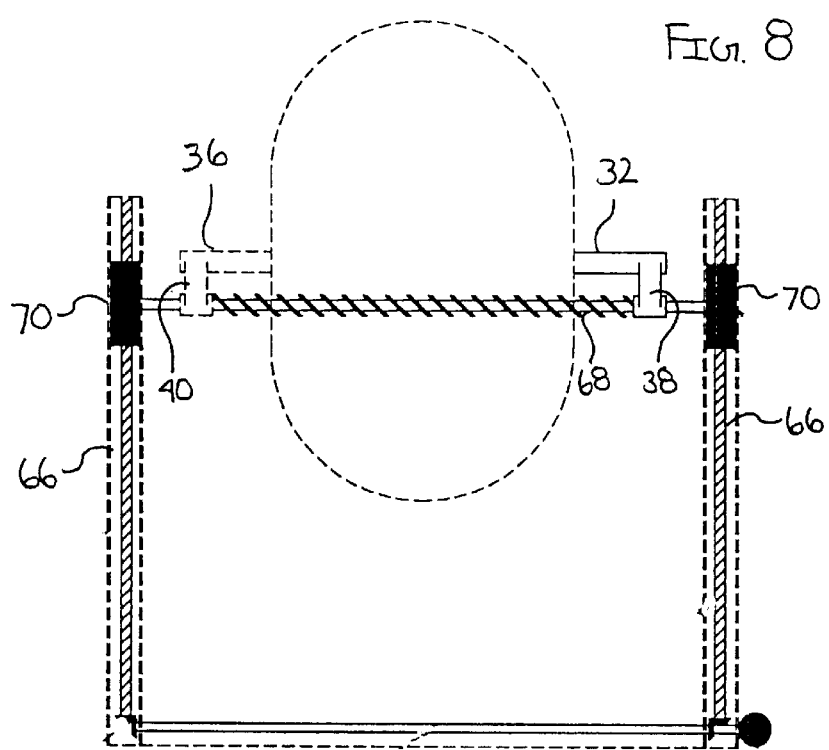

RECREATIONAL VEHICLE

This application claims benefit of provisional application 60/129,160 filed Apr. 14, 1999.

FIELD OF THE INVENTION

The present invention relates to all terrain vehicles.

BACKGROUND OF THE INVENTION

The use of all terrain vehicles has become increasingly popular over the past number of years both as a recreational vehicle and for the more practical purpose of providing access to otherwise inaccessible locations. To date, most of the popular all terrain vehicles use conventional technologies in that they resemble known motor vehicles. The all terrain vehicles may come in either a three wheel or four wheel design.and they are driven by conventional fossil fuel engines. The all terrain vehicles are designed to travel over land and at the same time, they can also handle certain snow conditions.

However, when the snow is relatively deep, and particularly when it is a soft snow, the conventional all terrain vehicle is unable to function. Under such conditions, snowmobiles have been used. However, even snowmobiles can have problems with certain types of snow conditions as increasingly they are designed to function as a means of transport on packed trails and are not suitable for off trail use.

Generally, neither of the above vehicles are suitable for use on water although there have been proposals for amphibious types of vehicles which represent different combinations of ground and snow vehicles. Generally, the amphibious type vehicles have been equipped with a screw propeller for propelling the vehicle through water. There have been many proposals in the art for amphibious vehicles and thus, U.S. Pat. Nos. 3,534,701 and 3,474,751, both to Hebert, show amphibious snow vehicles. A further example of such a type of vehicle is disclosed in U.S. Pat. No. 3,521,595 while U.S. Pat. No. 3,450,089 shows a boat which may also be used on land.

SUMMARY OF THE INVENTION

It is an object of the present invention to provide an all terrain vehicle which is suitable for use on both land and snow.

It is a further object of the present invention to provide an amphibious vehicle which may be used on snow, land and water.

It is a further object of the present invention to provide a novel all terrain vehicle which provides superior handling characteristics when used to travel over snow.

According to one aspect of the present invention, there is provided a recreational vehicle which comprises a body portion, a pair of spaced apart front wheels, an endless track located rearwardly of said spaced apart front wheels, drive means operative to drive the endless track, and steering means connected to the pair of spaced apart front wheels for steering the same.

In general terms, the recreational vehicle of the present invention can have several different configurations. In one configuration, the recreational vehicle can be adapted for use on either land or snow, while in another configuration, it can also function as an amphibious vehicle.

In the configuration wherein the recreational vehicle is amphibious, the body portion will have an external configuration of a boat hull. As will be appreciated, boat hulls can have very many different shapes and accordingly, the body of the amphibious vehicle could be suitably configured by one knowledgeable in the art to provide floatation in the water.

For travel on both land and snow, the recreational vehicle is equipped with a pair of front wheels and an endless track drive located rearwardly of the front wheels. The front wheels are steerable and in this respect, any conventional steering linkage may be employed. Preferably, the steering is by means of handle bars similar to those used in snowmobiles although it would be within the scope of the invention to use any other conventional type of steering such as steering wheels commonly used in all terrain vehicles.

The front wheels are used in both the mode for traveling on land and for traveling on snow. Preferably, the tires are oversize similar to those used on many conventional all terrain vehicles to provide some floatation when traveling on snow.

The endless track drive may be of the type commonly used on snowmobiles. Many such arrangements are known to those skilled in the art and need not be discussed herein.

The endless belt itself may be designed to have either a larger or smaller cleat having a downwardly extending lag. In the instance wherein the vehicle is used amphibiously, the downwardly extending lag provides the propulsion.

The vehicle may be powered by any conventional source of power with a preferred drive means comprising a fossil fuel engine similar used in present day all terrain vehicles and snowmobiles.

As aforementioned, the drive means is coupled to drive the endless track while in one particular embodiment, there also may be an arrangement to drive the front wheels.

In a preferred embodiment, the endless track is entrained about floatable wheels which serve to provide floatation.

BRIEF DESCRIPTION OF THE DRAWINGS

Having thus generally described the invention, reference will be made to the accompanying drawings illustrating an embodiment thereof, in which:

FIG. 3 is a rear elevational view thereof;

FIG. 4 is a side elevational view illustrating the retraction of the drive means into the body;

FIG. 7 is a detail side elevational view of the means for withdrawing the endless track into the body;

FIG. 8 is a front elevational view thereof; and

DESCRIPTION OF THE PREFERRED EMBODIMENTS

Figure 1:
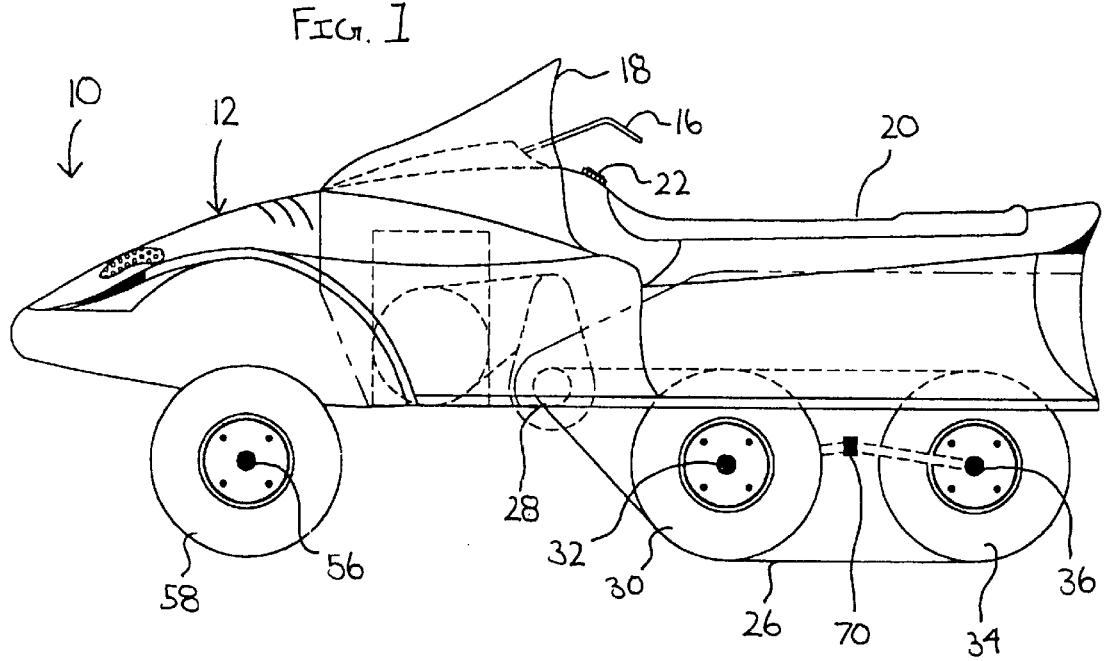
FIG. 1 is a side elevational view of an amphibious vehicle according to the present invention.
Figure 2:
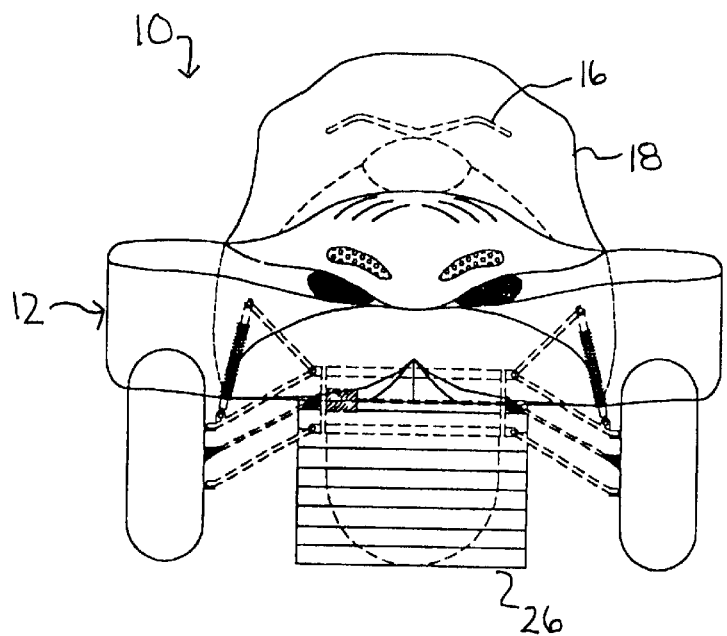
FIG. 2 is a front elevational view thereof.
Figure 5:
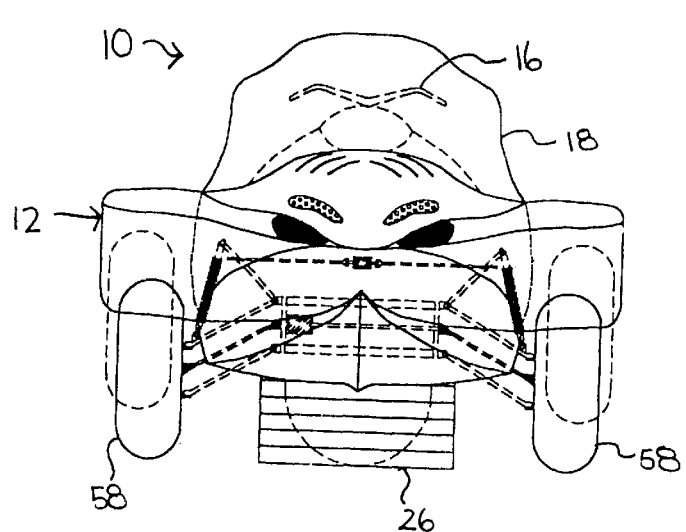
FIG. 5 is a front elevational view illustrating the retraction of the drive means into the body.
Figure 6:
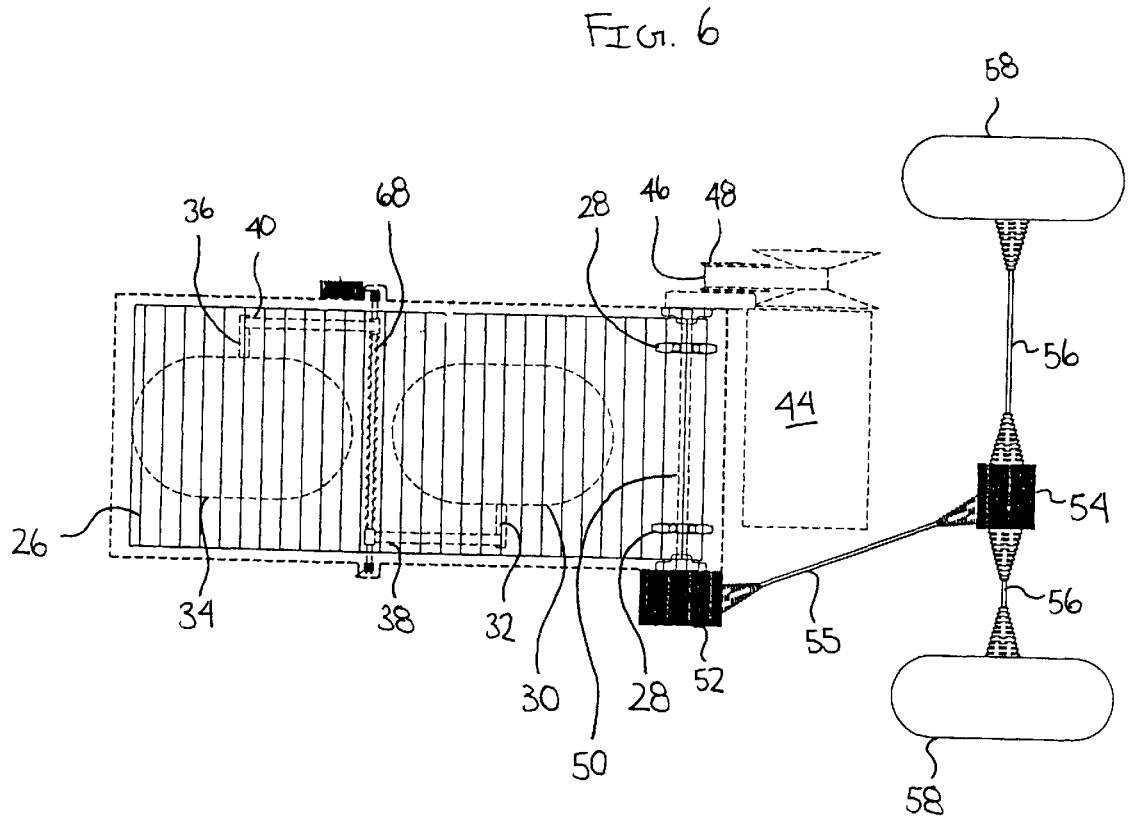
FIG. 6 is a bottom view illustrating the connection of the drive means.

Referring to the drawings in greater detail and by reference characters thereto, there is illustrated an amphibious vehicle which is generally designated by reference numeral 10.

Amphibious vehicle 10, in the illustrated embodiment, has the general overall configuration of a conventional snowmobile although it will be understood that other configurations including an enclosed body could be utilized. Amphibious vehicle 10 includes a conventional snowmobile body 12 having an instrument panel 14 thereon. A handlebar assembly 16 is provided for steering the vehicle as will be discussed in greater detail hereinbelow while a windshield 18 is provided in a known manner. The vehicle carries one or more people on a seat 20 and may be fueled through a fuel cap 22 leading to a conventional fuel tank (not shown).

Amphibious vehicle 10 includes, as a first drive means, an endless track 26 which may be similar to those presently used on snowmobiles. It will be understood that various endless tracks 26 may be employed depending on the particular conditions encountered. Endless track 26 is entrained about a first wheel 30 mounted on axle 32 and a second wheel 34 mounted on an axle 36. In turn, axle 32 is carried by an arm 38 while axle 36 is carried by an arm 40 for reasons which will become apparent hereinbelow.

Power is transferred to endless track 26 by means of sprocket drives 28 as is known in the art.

A motor 44 transfers drive power through belt 46 to a driven pulley 48. In turn, power is transmitted through shaft 50 having sprocket drives 28 mounted thereon for driving endless belt 26.

At the other end of shaft 50, there is provided a power transfer case 52. Power from transfer case 52 is transferred to transmission 54 by means of a shaft 55. A pair of front wheels 58 mounted on axle 56 are thus driven through transfer of power from transfer case 52 to transmission 54.

In the above arrangement, the vehicle is thus powered by a rear endless belt with front wheels 58 also being driven. This provides a substantial advantage under all types of conditions. For use in snow, in addition to the conventional endless track 26, mode of power is also provided by front wheels 58. Front wheels 58, which replace the conventional skis on snowmobiles, provide the same directional stability while also providing flotation for the vehicle particularly in deep snow.

When the vehicle is driven on packed snow or the ground, again the wheels 58 provide a conventional steering control which would not be achievable through skis.

In the water, the combination of endless track 26 and front wheels 58 provides a very good drive and control, particularly if the lags on endless track 26 extend outwardly from the belt for a larger distance—i.e. they function as a paddle wheel.

When used in water, flotation is provided through body 12 and accordingly, the endless track 26 and front wheels 58 must be retracted. To this end, there is provided a motor 64 to drive a worm gear shaft 66. Shaft 66 is connected to a mounting block 70 which in turn is connected to a horizontal shaft 68. Arms 38 and 40 which carry axles 32, 36 and wheels 30, 34 are mounted thereto such that rotation will cause a retraction of the assembly up within the body of the amphibious vehicle 10.

Figure 9:
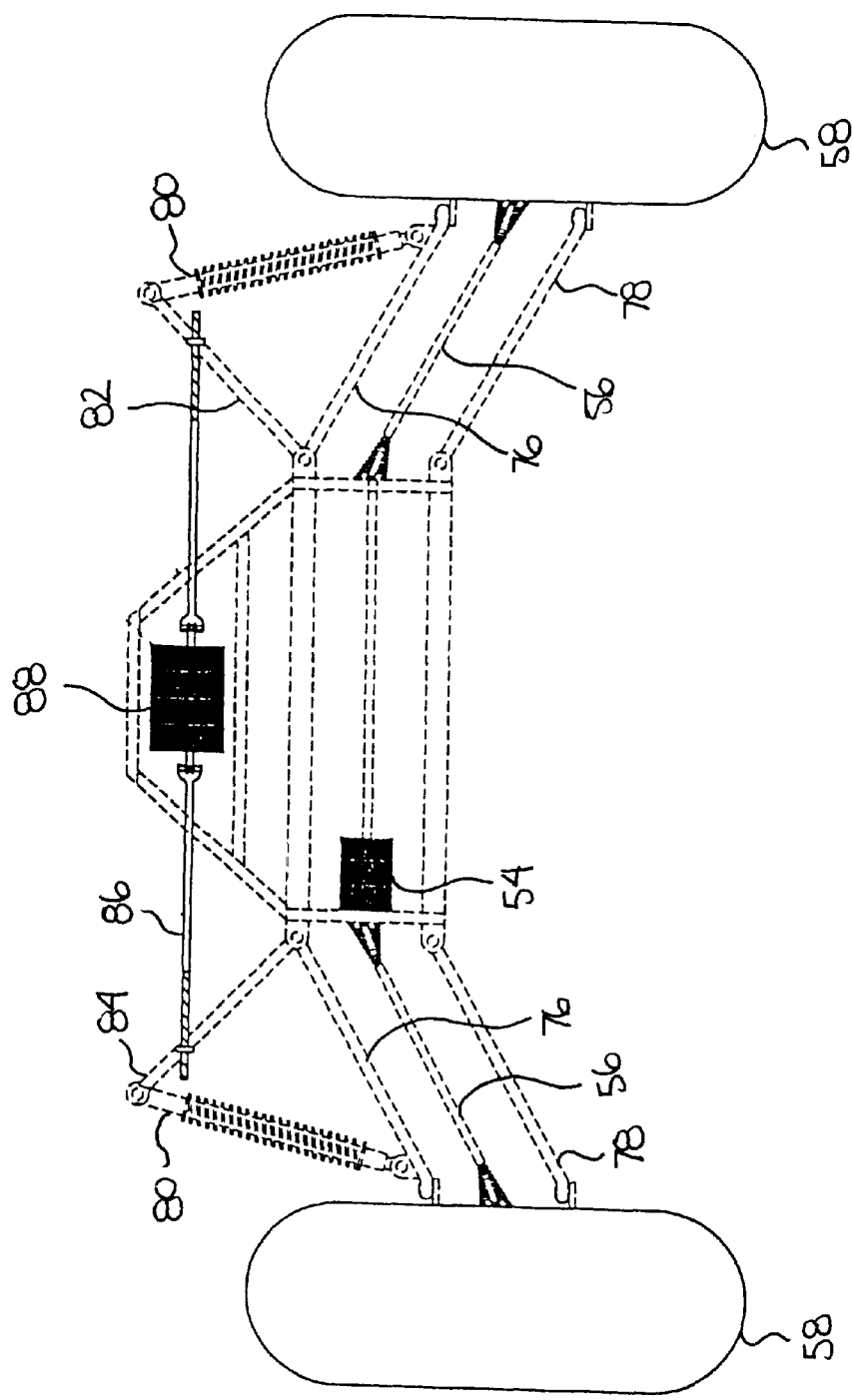
FIG. 9 is a front elevational view of the mounting system for the wheels.

As shown in FIG. 9, a similar arrangement may be provided wherein the front wheels are retracted upwardly by means of a transfer case driving worm gear shafts.

In greater detail, there is provided upper suspension arms 76 and lower suspension arms 78 operatively connected to wheels 58. A shock absorber 80 is connected to upper suspension arm 76 at one end thereof and is triangulated to the other end of upper suspension arm 76 by means of arm 84. A screw drive member 86 interfaces with arm 84 and is driven by motor 88 so as to move arm 84 closer to or further away the central portion and thereby lower or raise the wheels.

It will be seen from the above that there is thus provided a vehicle which is suitable for travel on land, in snow and on water without requiring modifications thereto.

It will be understood that the above described embodiment is for purposes of illustration only and that changes and modifications may be made thereto without departing from the spirit and scope of the invention.

I claim:

1. A recreational vehicle for use on both ground and snow without requiring modification, said vehicle comprising:
    a body;
    a pair of spaced apart independent front wheels;
    an endless track located rearwardly and intermediate of said spaced apart front wheels;
    a motor, said motor being operatively connected to both said pair of spaced apart oversized independent front wheels and to said endless track to permit simultaneous driving of both said wheels and said endless track to thereby permit operation of said vehicle on both ground and snow without requiring modification;
    steering means connected to said pair of spaced apart front wheels.

2. The recreational vehicle of claim 1 wherein said endless track is entrained about first and second wheels, each of said wheels being floatable.

3. The recreational vehicle of claim 1 wherein said drive means are also connected to said pair of spaced apart front wheels by means of a power transfer case, a rotatable shaft, and a transmission connected to each of said front wheels.

4. The recreational vehicle of claim 1 wherein said body is configured as a boat hull.

5. The recreational vehicle of claim 4 wherein said body includes a recess adjacent each of said spaced apart front wheels, said recreational vehicle further including means to retract each of said front wheels into a respective one of said recesses.

6. The recreational vehicle of claim 1 wherein said steering means comprises a pair of handle bars.

7. A recreational vehicle for use on both ground and snow without requiring modification, said vehicle comprising:
    a body configured as a boat hull;
    a pair of spaced apart independent front wheels;
    an endless track located rearwardly and intermediate of said spaced apart front wheels;
    a motor, said motor being operatively connected to both said pair of spaced apart oversized independent front wheels and to said endless track to permit simultaneous driving of both said wheels and said endless track to thereby permit operation of said vehicle on both ground and snow without requiring modification;
    steering means connected to said pair of spaced apart front wheels; and
    said body including a recess above said endless track, said recreational vehicle having means to retract said endless track into said recess.

* * * * *